United States Patent
Mbaye et al.

(10) Patent No.: US 11,415,478 B2
(45) Date of Patent: Aug. 16, 2022

(54) PROTECTIVE HOUSING FOR PROTECTING AN ELECTRONIC DEVICE FROM ENVIRONMENTAL CONDITIONS

(71) Applicant: A. RAYMOND ET CIE, Grenoble (FR)

(72) Inventors: Mansour Mbaye, Moirans (FR); Christian Schoelzel, Wyhl am Kaiserstuhl (DE); Julien Rat, Rivier Apprieu (FR); Jean-Luc Jesslen, Berrwiller (FR)

(73) Assignee: A. RAYMOND ET CIE, Grenoble (FR)

( * ) Notice: Subject to any disclaimer, the term of this patent is extended or adjusted under 35 U.S.C. 154(b) by 0 days.

(21) Appl. No.: 17/054,475

(22) PCT Filed: May 14, 2019

(86) PCT No.: PCT/FR2019/051094
§ 371 (c)(1),
(2) Date: Jan. 12, 2021

(87) PCT Pub. No.: WO2019/224453
PCT Pub. Date: Nov. 28, 2019

(65) Prior Publication Data
US 2021/0293647 A1    Sep. 23, 2021

(30) Foreign Application Priority Data
May 22, 2018  (FR) ...................... 1854246

(51) Int. Cl.
*G01L 19/00*  (2006.01)
*G01L 19/14*  (2006.01)
*G01L 19/06*  (2006.01)

(52) U.S. Cl.
CPC ........ *G01L 19/149* (2013.01); *G01L 19/0038* (2013.01); *G01L 19/0654* (2013.01); *G01L 19/147* (2013.01)

(58) Field of Classification Search
None
See application file for complete search history.

(56) References Cited

U.S. PATENT DOCUMENTS 5,528,941 A    6/1996 Ogawa
5,661,244 A    8/1997 Nishimura et al.
(Continued)

OTHER PUBLICATIONS

International Search Report for Application No. PCT/FR2019/051094 dated Aug. 9, 2019, 2 pages.
(Continued)

*Primary Examiner* — Lisa M Caputo
*Assistant Examiner* — Nigel H Plumb
(74) *Attorney, Agent, or Firm* — TraskBritt

(57) ABSTRACT

A protective housing for protecting an electronic device includes a plurality of walls defining a casing, a plurality of partitions, and at least one flow groove. One of the walls of the housing, referred to as the main wall, has an opening covered with a membrane for exposing a part of a measuring device to atmospheric pressure. The plurality of partitions are arranged on the outer surface of the main wall and separated from each other by passages. The plurality of partitions are arranged around the opening to completely surround the opening and protect the membrane. The at least one flow groove is arranged next to the opening, in order to allow liquid that may accumulate around the opening and/or against the partitions to be discharged. The present disclosure also concerns a pressure sensor, in particular, for a tank of a motor vehicle, using such a protective housing.

13 Claims, 2 Drawing Sheets

(56) References Cited

U.S. PATENT DOCUMENTS

| | | |
|---|---|---|
| 5,692,637 A | 12/1997 | Hodge |
| 5,747,694 A | 5/1998 | Baba et al. |
| 6,506,110 B1 | 1/2003 | Borisch |
| 6,807,864 B2 | 10/2004 | Takakuwa et al. |
| 6,964,200 B2 | 11/2005 | Miyazaki et al. |
| 6,994,621 B2 | 2/2006 | Mashiko et al. |
| 7,055,391 B2 | 6/2006 | Tokuhara |
| 7,166,024 B2 | 1/2007 | Mashiko et al. |
| 7,406,875 B2 | 8/2008 | Wanami et al. |
| 7,454,976 B2 | 11/2008 | Wanami et al. |
| 7,465,887 B2 | 12/2008 | Suzuki |
| 7,503,784 B2 | 3/2009 | Osborne et al. |
| 7,568,393 B2 | 8/2009 | Adam et al. |
| 7,626,129 B2 | 12/2009 | Sasaki et al. |
| 7,743,750 B2 | 6/2010 | Ritz et al. |
| 8,109,148 B2 | 2/2012 | Habibi et al. |
| 8,246,726 B2 | 8/2012 | Yano |
| 8,292,109 B2 | 10/2012 | Lauk et al. |
| 8,375,778 B2 | 2/2013 | Borzabadi et al. |
| 8,413,496 B2 | 4/2013 | Eslami et al. |
| 8,505,386 B2 | 8/2013 | Colombo et al. |
| 8,544,333 B2 * | 10/2013 | Adam ................. G01L 19/0645 73/706 |
| 8,814,993 B2 | 8/2014 | Yano |
| 8,821,226 B2 | 9/2014 | Yano et al. |
| 8,869,623 B2 | 10/2014 | Yahata |
| 9,120,059 B2 | 9/2015 | Daimon et al. |
| 9,255,719 B2 | 2/2016 | Yano |
| 9,295,949 B2 | 3/2016 | Uemura et al. |
| 9,332,662 B2 | 5/2016 | Yano |
| 9,372,102 B2 | 6/2016 | Niemann et al. |
| 2001/0029786 A1 | 10/2001 | Takakuwa et al. |
| 2004/0177697 A1 * | 9/2004 | Tokuhara ............... G01L 19/142 73/715 |
| 2012/0247179 A1 | 10/2012 | Kerin et al. |
| 2015/0330421 A1 * | 11/2015 | Kotowicz ............... F15B 20/00 138/30 |
| 2017/0089794 A1 | 3/2017 | Schonhardt et al. |

OTHER PUBLICATIONS

International Search Report for Application No. PCT/FR2019/051094 dated Aug. 9, 2019, 5 pages.

* cited by examiner

PROTECTIVE HOUSING FOR PROTECTING AN ELECTRONIC DEVICE FROM ENVIRONMENTAL CONDITIONS

CROSS-REFERENCE TO RELATED APPLICATIONS

This application is a national phase entry under 35 U.S.C. § 371 of International Patent Application PCT/FR2019/051094, filed May 14, 2019, designating the United States of America and published as International Patent Publication WO 2019/224453 A1 on Nov. 28, 2019, which claims the benefit under Article 8 of the Patent Cooperation Treaty to French Patent Application Serial No. 1854246, filed May 22, 2018.

TECHNICAL FIELD

The present disclosure relates to a protective housing for protecting an electronic device, e.g., for measuring pressure. The housing and the electronic device can form part of a pressure sensor to equip, for example, the tank of a motor vehicle.

BACKGROUND

US2001029786, for example, discloses a sensor for measuring the internal pressure of a fuel tank. A transducer component separates a first volume wherein the pressure of the reservoir prevails from a second volume wherein the atmospheric pressure prevails. The component is sensitive to the pressure difference prevailing between these two volumes, and an electronic device associated with the film makes it possible to provide a measurement of this relative pressure.

To maintain the second volume at atmospheric pressure, it is customary to provide an opening into this volume. A waterproof but gas-permeable membrane is placed over the opening to cover it. This prevents water, or more generally liquid, from filling this second volume, which would of course affect the measurement.

It is generally sought to firmly fix the membrane to the housing defining the second volume, in order to prevent it from becoming detached, while it can withstand high levels of mechanical stress, for example, under the effect of a pressurized water jet.

A pressure balance is also generally sought between those prevailing in the second volume and the atmosphere in order to ensure the fidelity of the reservoir pressure measurement. In particular, it is sought to prevent a film of liquid from obscuring the waterproof membrane, which then no longer allows air to circulate freely in and out of the second volume.

These problems are widely documented in the prior art. For example, a variety of solutions aimed at solving these problems can be found in the following documents: U.S. Pat. Nos. 5,528,941, 5,661,244, 5,692,637, 5,747,694, 6,506,110, 6,807,864, 6,964,200, 6,994,621, 7,055,391, 7,166,024, 7,406,875, 7,454,976, 7,465,887, 7,503,784, 7,568,393, 7,626,129, 7,743,750, 8,109,148, 8,246,726, 8,292,109, 8,375,778, 8,413,496, 8,505,386, 8,544,333, 8,814,993, 8,821,226, 8,869,623, 9,120,059, 9,255,719, 9,295,949, 9,332,662, 9,372,102, US2012/0247179, US2015/0330421, US2017/0089794.

BRIEF SUMMARY

The present disclosure aims to provide, at least in part, an original solution to the aforementioned problems.

With a view to achieving this aim, the object of the present disclosure provides a protective housing for protecting an electronic device, wherein the housing comprises a plurality of walls defining a casing in which to arrange the electronic device, and wherein one of the walls, referred to as the main wall, has an opening for exposing a part of the measuring device to atmospheric pressure.

This housing comprises, arranged on the outer surface of the main wall, a plurality of partitions separated from each other by passages and arranged around the opening to completely surround it and at least one flow groove arranged next to the opening, in order to allow liquid that may be likely to accumulate around the opening and/or against the partitions to be discharged.

By combining "labyrinth-forming" protective partitions around the opening with at least one discharge groove, it is possible to position a waterproof membrane over the opening of the housing without risking obscuring the opening by a film of liquid that would no longer allow a part of the electronic device to be exposed to atmospheric pressure. Delamination of the membrane under the effect of external mechanical stresses is also avoided.

According to other advantageous and non-limiting characteristics of embodiments of the present disclosure, taken alone or in any technically feasible combination:
- the outer surface of the main wall defines a main plane and the opening is arranged in this main plane;
- the partitions are perpendicular to the main wall;
- the partitions are placed at a first distance from the opening and further partitions are placed at a second distance from the opening, the second distance being greater than the first;
- a first series of partitions is arranged around the opening and the partitions are separated from each other by first passages, and a second series of partitions is arranged vis-à-vis the first passages so that the opening is completely surrounded by the partitions;
- the groove is positioned between the opening and a partition;
- at least one of the partitions is formed from a side of an electrical connector.

The object of the present disclosure also provides a pressure sensor, in particular, for a tank of a motor vehicle, comprising a body, an electronic pressure measuring device mounted on the body, a protective housing as described above connected to the body, and a membrane connected to the housing to cover the opening.

BRIEF DESCRIPTION OF THE DRAWINGS

Further characteristics and advantages of the present disclosure will emerge from the detailed description of the present disclosure below with reference to the accompanying drawings in which.

DETAILED DESCRIPTION

Figure 1:
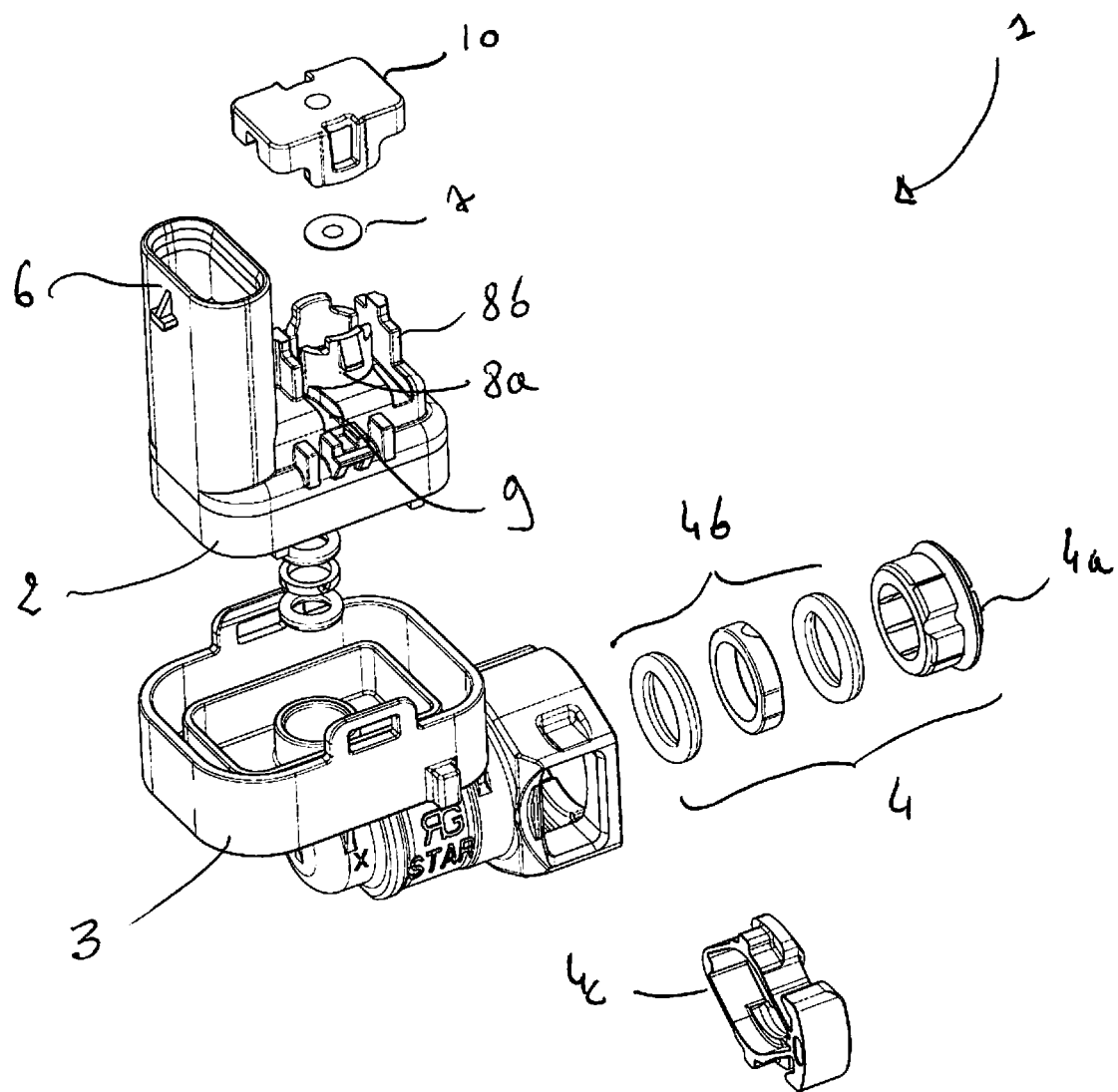
FIG. 1 is an exploded view of a pressure sensor employing a protective housing according to the present disclosure.

With reference to the drawings, a pressure sensor 1 employing a protective housing 2 for protecting an electronic device 5 is presented. The sensor 1 comprises a body 3 defining a first volume 3a. The body 3 is provided with a sealing system 4 making it possible to associate the sensor 1 with a tank whose internal pressure is to be measured, for example, the tank of a motor vehicle. In the example shown in the drawings, the sealing system 4 is a female connector making it possible to snap the sensor 1 onto a male connector of the tank, by means of a lock 4c. A seal-washer assembly 4b, held in the body 3 by a ring 4a, ensures its sealing function. The present disclosure is however in no way limited to the connector shown, and any mechanism making it possible to connect the pressure sensor to the tank so that the pressure in the first volume is equal to that of the tank may be suitable.

Figure 2:
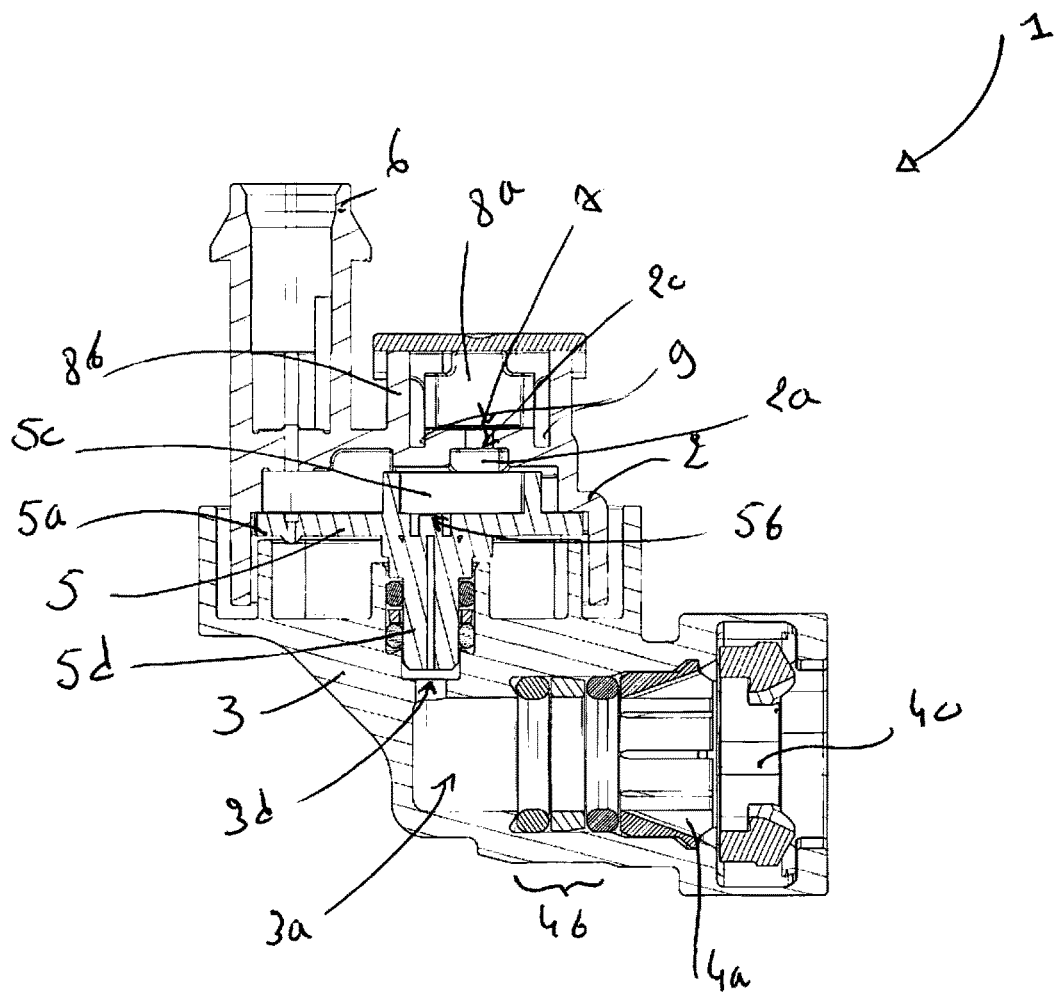
FIG. 2 is a section of a pressure sensor.

The electronic device 5 for measuring the relative pressure is mounted on the body 3. In the example shown in FIG. 2, this device comprises a PCB ("Printed Circuit Board") support 5a on the faces of which the various components of the device are arranged. There is, in particular, a pressure-sensitive transducer component 5b, placed in line with an opening in the support 5a, making it possible to expose each face of the component to a pressure which may be different.

One face of the transducer component 5b is exposed to the first pressure prevailing in the first volume 3a of the body 3. For this purpose, a passage 3d has been arranged in the body 3 between the first volume 3a and a bore provided to receive a duct 5d, for example, a glass duct, from the electronic device 5. The duct 5d is connected to the support 5a, in line with the transducer component 5b, and allows the fluid of the first volume 3a to be circulated, through the passage 3d and up to a first face of the transducer component 5b. A seal-washer assembly arranged in the bore of the body 3 seals the connection between the body 3 and the duct 5d, in order to completely isolate the first volume 3a, in communication with the tank whose pressure is to be measured, from the external environment.

The electronic device 5 is protected by a protective housing 2. This housing 2 is formed of several walls defining a casing in which the electronic device resides. At least part of the casing constitutes a second volume 2a in which it is sought to make atmospheric pressure prevail, in order to expose the second face of the transducer component 5b therein. The second volume 2a can be partially filled with a protective material 5c, such as a gel, arranged on the transducer component 5b. The second volume 2a defined by the protective housing 2 is in communication with the external environment via an opening 2c made on one of the walls, referred to as the main wall, of the housing 2. In the example shown in the drawings, the side walls of the housing 2 engage in a peripheral groove made on the body 3 so as to close the casing on the electronic device 5 to protect it mechanically. Resilient brackets 2d, clearly visible in FIG. 3, allow the housing 2 to be retained on the body. One could of course consider any other mechanism for maintaining the housing 2 on the body 3. Preferably, the connection between the housing 2 and the body 3 is sealed, so as to protect the electronic device 5 from the intrusion of water or dust. In this case, the only communication between the interior of the housing and its environment is therefore the opening 2c.

The relative pressure measurement established by the electronic device can be supplied to the pins 6a of an electrical connector 6, here arranged on the main face of the housing 2.

As was specified in the introduction to the present application, it is important to maintain the interior of the second volume 2a at atmospheric pressure. For this purpose, provision has been made to cover the opening 2c with a waterproof, hydrophobic and gas-permeable membrane 7. In this way, the outside air can be allowed to freely enter and exit the interior of the casing and the second volume 2a through the opening 2c so that there is constant atmospheric pressure in the second volume 2a.

The waterproof membrane 7 also prevents a liquid from flowing through the opening 2c into the second volume 2a, which would affect the measurement. Its hydrophobic nature also prevents a film of liquid from permanently covering the membrane 7, thus preventing the circulation of air through the opening 2c. By way of example, it may be a Teflon membrane, here in the form of a disc, glued to the housing. It could however be envisaged that the membrane be made of another material or have another shape without departing from the scope of the present disclosure.

The main wall of the housing 2 has an outward facing surface, which defines a main plane of the housing 2. In the example shown in the drawings, the membrane 7 is directly connected to the main wall of the housing 2, i.e., the assembly surface of the membrane resides in the main plane of the housing 2. The opening 2c and the membrane 7 are therefore not arranged in a recess or on an elevation of the housing 2, which would have placed them outside the main plane. In this configuration, the water does not drain naturally from the membrane 7 or its vicinity as is the case when the latter is placed on a dome, in elevation. The peripheral flank of the membrane 7 is exposed to external mechanical stresses, for example, to splashing water, which can lead over time to it becoming detached. Such a phenomenon is reduced when the membrane 7 is placed in a reinforcement of the main wall of the housing 2, which makes the peripheral side of the membrane less accessible.

To prevent these phenomena in the assembly configuration of the membrane 7 shown in the drawings, provision has been made to provide the housing 2 with a plurality of partitions 8a, 8b arranged around the opening 2c so as to protect the peripheral side of the membrane 7. The partitions can be arranged perpendicular to the main wall of the housing 2. The partitions 8a, 8b are separated from each other by passages allowing liquids to be discharged and air to be circulated. The arrangement of the partitions 8a, 8b around the opening 2c is such that the entire peripheral side of the membrane 7 is protected from the external environment by at least one of the partitions. In other words, the edge of the opening 2c is entirely surrounded by the partitions 8a, 8b and any portion of the edge of the opening 2c, and therefore of the side of the membrane 7, is masked by at least one of the partitions 8a, 8b. This "labyrinth-forming" configuration ensures both the protection of the peripheral side of the membrane 7 against external mechanical stresses and prevents the accumulation of liquid, which can escape through the passages arranged between the partitions 8a, 8b.

To promote the discharge of liquids, provision has also been made to arrange at least one flow groove 9 in the main wall of the housing 2, next to the opening 2c, the membrane 7 and the partitions 8a, 8b. In this way, it is sought to prevent the accumulation of liquid, in the form of a film or drops, around the opening 2c and/or against the partitions 8a, 8b, by capillary action. The two flow grooves 9 provided in the example shown make it possible to break the surface tension of the film or the drops of liquid. This liquid can then be discharged, guided by the grooves 9, and flow, for example, on the side walls of the housing 2. To this end, the groove or the plurality of grooves 9 extends over the entire main wall of the housing to emerge onto at least on one side of this wall and advantageously on two or more sides of the wall.

Figure 3:
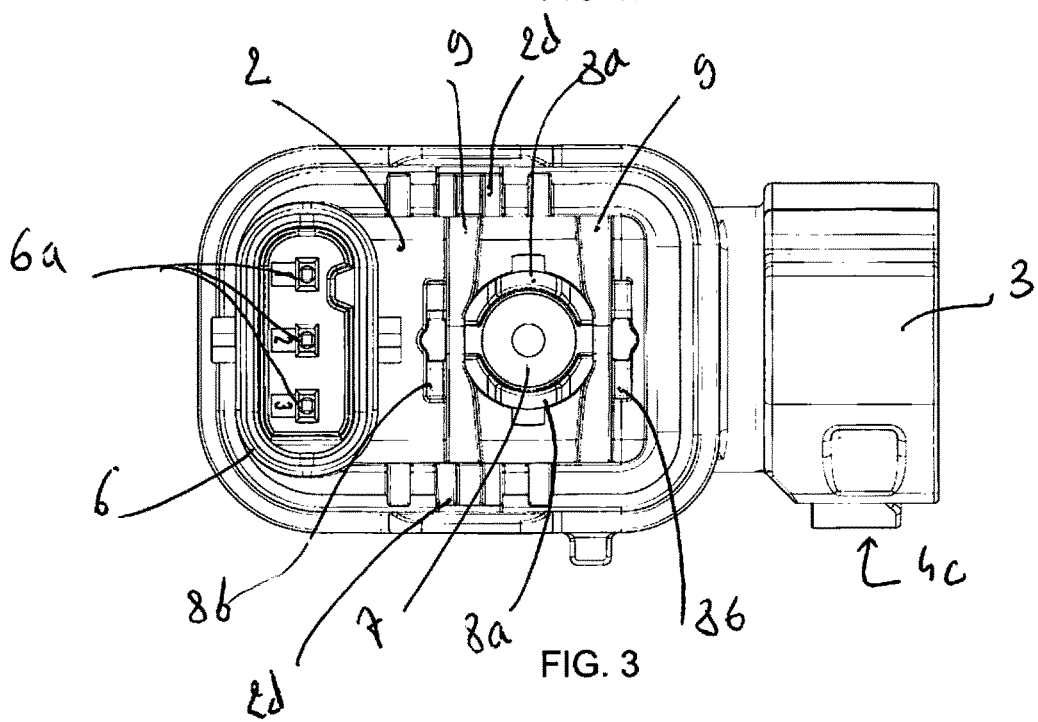
FIG. 3 is a top view of a protective housing according to the present disclosure.

In the example shown, and as can be seen more clearly in FIG. 3, the plurality of partitions 8a, 8b consists of a first series of separate partitions 8a, here two partitions 8a, and separated from each other by the first passages. They are placed in the immediate vicinity of the opening 2c and the membrane 7, i.e., at a first distance, which is relatively short. These partitions 8a have portions in the main plane that match the shape of the membrane 7, here portions of a circle. These two partitions 8a are arranged facing each other, on either side of the opening 2c. To protect the portions of the peripheral side of the membrane exposed by the passages existing between the two partitions 8a of the first series, a second series of complementary partitions 8b is provided, distinct and separated from the partitions 8a of the first series by complementary passages. These complementary partitions 8b here have straight portions in the main plane. They are arranged vis-à-vis each other and the first passages, on either side of the opening 2c and the membrane 7, to obscure from the outside the existing passages between the partitions 8a of the first series. The complementary passages between the first and the second series of partitions are made by placing this second series of partitions 8b at a second distance from the opening 2c, the second distance being greater than the first distance separating the first series of partitions 8a from the opening 2c. In this example, provision is made to form two flow grooves 9 in the main wall of the housing, in the space cleared between the opening 2c and the partitions 8b with a straight portion of the second series. The two grooves 9 extend over the entire main wall to emerge onto two opposite sides of this wall and to allow water to flow over the side walls.

Other series of partitions could of course also be provided, or arranged in the main plane according to a different "labyrinth-forming" arrangement than that which has just been described, insofar as these partitions are arranged to completely obscure, in all possible directions of approach, the peripheral side of the membrane 7 from its remote environment and therefore entirely surround the opening 2c. The partitions can have other functions in addition to the protective function that has just been described. Thus, in an exemplary embodiment not shown, at least one of the partitions 8a or one of the complementary partitions 8b can be formed from the vertical side of the electrical connector 6. This can make it possible to make the housing more compact, by bringing the opening 2c and the protective partitions 8a, 8b closer to the connector.

Thus, by combining protective partitions 8a, 8b in a "labyrinth-forming" manner around the membrane 7 with discharge grooves 9, it is possible to choose to position the membrane 7 in the main plane defined by the wall of the housing without risking covering this membrane 7 with a film of liquid or risk its delamination under the effect of external mechanical stresses.

In addition to protecting the opening 2c and the membrane 7, provision has been made in the sensor 1, taken as an example, to mount a protective cover 10 overhanging the membrane 7. This cover has two openings in which notches formed on the outer faces of the partitions 8a of the first series can be placed. In this way, the cover 10 can easily be clipped to the housing 2.

Of course, the present disclosure is not limited to the embodiment described and alternative embodiments can be provided without departing from the scope of the present disclosure as defined by the claims.

One could, for example, consider placing the opening 2c, the partitions 8a, 8b and the discharge grooves 9 in a plane other than the main plane, on a dome or in a recess of the main wall of the housing 2, and obtain the same benefits as those which have been exposed.

Furthermore, the electronic device is not necessarily a pressure measuring device. The present disclosure applies in fact to any protective housing for protecting any electronic device, in particular, when the electronic device must be protected from its environment, while maintaining communication with the environment, for example, for reasons of heat removal.

The invention claimed is:

1. A protective housing for protecting an electronic device, comprising:
    a plurality of walls defining a casing in which the electronic device may be disposed, wherein a main wall of the plurality of walls has an opening for exposing a part of the electronic device to atmospheric pressure, the opening being covered with a membrane and wherein the protective housing comprises:
        a plurality of partitions arranged on an outer surface of the main wall and around the opening so as to surround the opening and protect a peripheral side of the membrane from the external environment, the plurality of partitions separated from each other by passages; and
        at least one flow groove arranged on the outer surface of the main wall and next to the opening so as to allow liquid that might accumulate around the opening and/or against the partitions to be discharged.

2. The protective housing of claim 1, wherein the outer surface of the main wall defines a main plane, and wherein the opening is located in the main plane.

3. The protective housing of claim 2, wherein the partitions are perpendicular to the main wall.

4. The protective housing of claim 3, wherein at least some of the partitions of the plurality are located a first distance from the opening, and at least others of the partitions are located at a second distance from the opening, the second distance being greater than the first distance.

5. The protective housing of claim 4, wherein a first series of partitions of the plurality is arranged around the opening, the partitions of the first series being separated from each other by first passages, and wherein a second series of partitions of the plurality is arranged vis-à-vis the first passages so that the opening is completely surrounded by the partitions of the plurality of partitions.

6. The protective housing of claim 5, wherein the at least one flow groove is positioned between the opening and a partition of the plurality of partitions.

7. The protective housing of claim 6, wherein at least one partition of the plurality of partitions is formed from a side of an electrical connector.

8. The protective housing of claim 1, wherein the partitions are perpendicular to the main wall.

9. The protective housing of claim 1, wherein at least some of the partitions of the plurality are located a first distance from the opening, and at least others of the partitions are located at a second distance from the opening, the second distance being greater than the first distance.

10. The protective housing of claim 1, wherein a first series of partitions of the plurality is arranged around the opening, the partitions of the first series being separated from each other by first passages, and wherein a second series of partitions of the plurality is arranged vis-à-vis the first passages so that the opening is completely surrounded by the partitions of the plurality of partitions.

11. The protective housing of claim 1, wherein the groove is positioned between the opening and a partition of the plurality of partitions.

12. The protective housing of claim 1, wherein at least one partition of the plurality of partitions is formed from a side of an electrical connector.

13. A pressure sensor, comprising:
- a body;
- an electronic pressure measuring device mounted on the body;
- a protective housing connected to the body, the protective housing including a plurality of walls defining a casing in which the electronic pressure measuring device may be disposed, wherein a main wall of the plurality of walls has an opening for exposing a part of the electronic device to atmospheric pressure, and wherein the protective housing has:
    - a membrane connected to the protective housing and covering the opening;
    - a plurality of partitions arranged on an outer surface of the main wall and around the opening so as to surround the opening and protect a peripheral side of the membrane from the external environment, the plurality of partitions separated from each other by passages; and
    - at least one flow groove arranged on the outer surface of the main wall and next to the opening so as to allow liquid that might accumulate around the opening and/or against the partitions to be discharged.

* * * * *